(12) United States Patent
Lee et al.

(10) Patent No.: US 11,689,086 B2
(45) Date of Patent: Jun. 27, 2023

(54) DEVICE FOR MANUFACTURING ROTOR CORE AND METHOD FOR MANUFACTURING ROTOR CORE

(71) Applicant: FANUC CORPORATION, Yamanashi (JP)

(72) Inventors: Seungjun Lee, Yamanashi (JP); Hidetoshi Uematsu, Yamanashi (JP); Makoto Funakubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 290 days.

(21) Appl. No.: 16/780,610

(22) Filed: Feb. 3, 2020

(65) Prior Publication Data

US 2020/0251969 A1 Aug. 6, 2020

(30) Foreign Application Priority Data

Feb. 5, 2019 (JP) ................. 2019-018605

(51) Int. Cl.
*H02K 15/03* (2006.01)
*H02K 1/276* (2022.01)
(Continued)

(52) U.S. Cl.
CPC ....... *H02K 15/03* (2013.01); *B29C 45/14065* (2013.01); *H02K 1/02* (2013.01);
(Continued)

(58) Field of Classification Search
CPC ......... Y10T 29/53143; Y10T 29/49012; Y10T 29/49009; Y10T 29/4902; H02K 15/0012; H02K 1/26; H02K 15/02; H02K 15/03
(Continued)

(56) References Cited

U.S. PATENT DOCUMENTS

2013/0099617 A1   4/2013  Chamberlin

FOREIGN PATENT DOCUMENTS

JP       2001-157394 A       6/2001
JP       WO2012026003     *  8/2010  ........... H02K 1/2766
(Continued)

OTHER PUBLICATIONS

An Office Action; "Notice of Reasons for Refusal," mailed by the Japanese Patent Office dated Jun. 1, 2021, which corresponds to Japanese Patent Application No. 2019-018605 and is related to U.S. Appl. No. 16/780,610 with with English translation.
(Continued)

*Primary Examiner* — Thiem D Phan
(74) *Attorney, Agent, or Firm* — Studebaker & Brackett PC (57) ABSTRACT

Provided is a manufacturing device and a manufacturing method for a rotor core that can prevent damage from being caused to an end of a magnet due to movement of the magnet when injecting a resin material. Included are a first mold including a fitting recess that fits and holds a laminated iron core in which a magnet is inserted into a magnet insertion hole, a second mold that is engaged with the first mold and clamps and seals the laminated iron core together with the first mold, a resin injection unit that is provided to the second mold, and injects a resin material into the magnet insertion hole, and a magnet positioning and holding mechanism that positions and holds the magnet in a state of being fit into the fitting recess of the first mold.

2 Claims, 6 Drawing Sheets

(51) Int. Cl.
   *B29C 45/14* (2006.01)
   *H02K 15/12* (2006.01)
   *H02K 1/02* (2006.01)

(52) U.S. Cl.
   CPC .............. *H02K 1/276* (2013.01); *H02K 15/12* (2013.01); *Y10T 29/53143* (2015.01)

(58) Field of Classification Search
   USPC .......... 29/732, 598, 596, 604, 609, 729, 738
   See application file for complete search history.

(56) References Cited

FOREIGN PATENT DOCUMENTS

| JP | 2013-009452 A | 1/2013 |
| JP | 2017-022886 A | 1/2017 |
| JP | WO20160147211 A1 | 12/2017 |
| WO | 2012/169043 A1 | 12/2012 |

OTHER PUBLICATIONS

An Office Action; "Notice of Reasons for Refusal", mailed by the Japanese Patent Office dated Jan. 6, 2022, which corresponds to Japanese Patent Application No. 2019-018605 and is related to U.S. Appl. No. 16/780,610; with English language translation.

* cited by examiner

DEVICE FOR MANUFACTURING ROTOR CORE AND METHOD FOR MANUFACTURING ROTOR CORE

This application is based on and claims the benefit of priority from Japanese Patent Application No. 2019-018605, filed on 5 Feb. 2019, the content of which is incorporated herein by reference.

BACKGROUND OF THE INVENTION

Field of the Invention

The present invention relates to a device for manufacturing a rotor core and a method FOR manufacturing a rotor core.

Related Art

Figure 1:
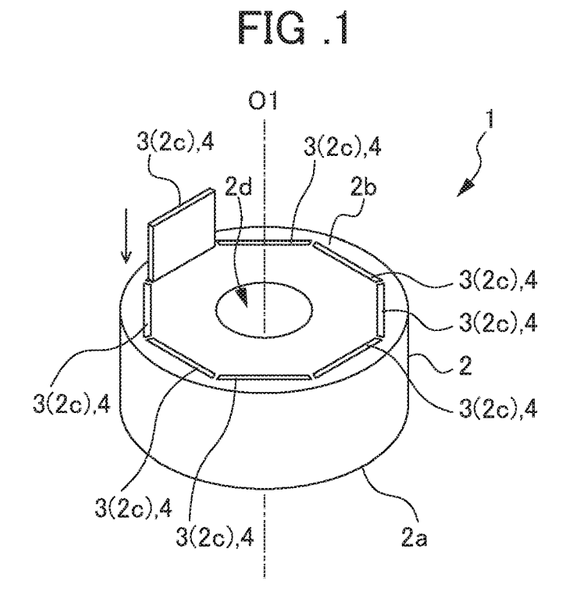
FIG. 1 is a cross-sectional view showing a rotor (rotor structure) of an embodiment.

For example, as shown in FIG. 1, the IPM-type rotor core (interior permanent magnet type rotor core) 1 is configured to include a laminated iron core 2 in which a plurality of core members (thin plate-shaped members) formed by punching an electromagnetic steel sheet is laminated, permanent magnets 3 that are each inserted into and accommodated in a magnet insertion hole 2c formed to penetrate from one end 2a to the other end 2b in an axis line O1 direction of the laminated iron core 2, and a resin material 4 for embedding and fixing the permanent magnets 3 by injecting the resin material 4 into the magnet insertion hole 2c.

Figure 2:
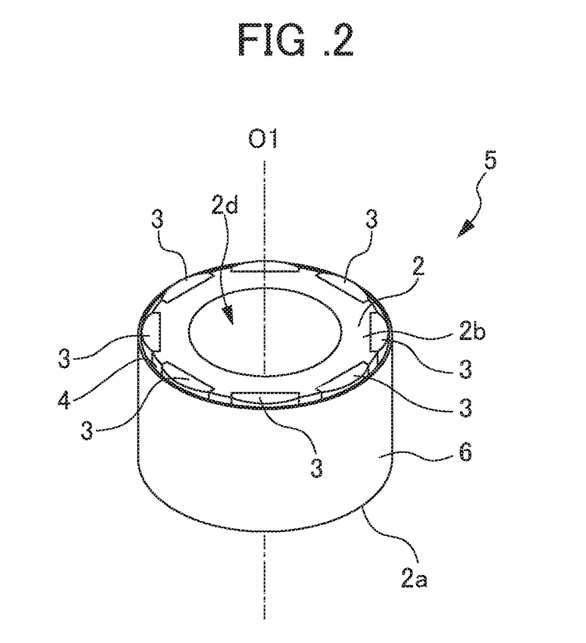
FIG. 2 is a perspective view showing a rotor core (an IPM-type rotor core) of one embodiment.

For example, as shown in FIG. 2, the SPM-type rotor core (surface permanent magnet type rotor core) 5 includes a laminated iron core 2, permanent magnets 3 which are arranged at equal intervals in the circumferential direction on the outer peripheral surface side of the laminated iron core 2, a cylindrical exterior member 6 which surrounds and covers the laminated iron core 2 with the permanent magnets 3, and a resin material 4 for embedding and fixing the permanent magnets 3 by injecting the resin material 4 between the exterior member 6 and the laminated iron core 2.

Furthermore, a center hole (shaft hole) 2d that is formed to penetrate from one end 2a to the other end 2b on its axis line O1 and is used for fitting a shaft of the rotor is provided in the laminated iron core 2.

Figure 8:
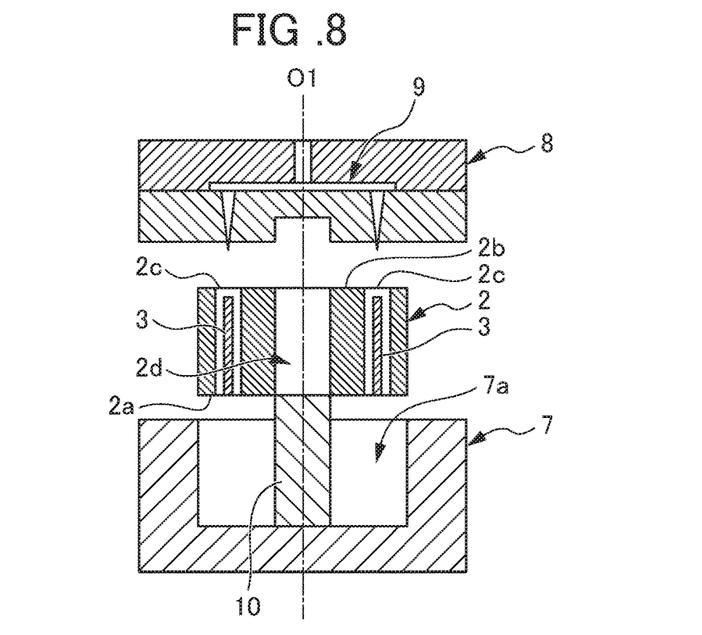
FIG. 8 is a cross-sectional view showing a manufacturing device and a manufacturing method for a conventional rotor core (an IPM-type rotor core)

On the other hand, for example, as shown in FIG. 8, a device for manufacturing the rotor cores 1 and 5 is configured to include: a first mold 7 having a fitting recess 7a that fits and holds the laminated iron core 2 mounted by inserting the permanent magnet 3 into the magnet insertion hole 2c (or a laminated iron core 5 to which the permanent magnet 3 and the exterior member 6 are mounted) in the axis line O1; a second mold 8 that is engaged with the first mold 7 and clamps/seals the laminated iron core 2 within a mold cavity with the first mold 7; and a resin injection unit 9 that is provided in the second mold 8 (or the first mold 7) and injects the resin material 4 in the magnet insertion hole 2c of the laminated iron core 2 within the mold cavity (or between the exterior member 6 and the laminated iron core 2)(for example, refer to Patent Document 1). When fitting the laminated iron core 2 in the fitting recess 7a, the first mold 7 is provided with a core rod 10 integrally for positioning and holding by being fit in the center hole (shaft hole) 2d.

Figure 9:
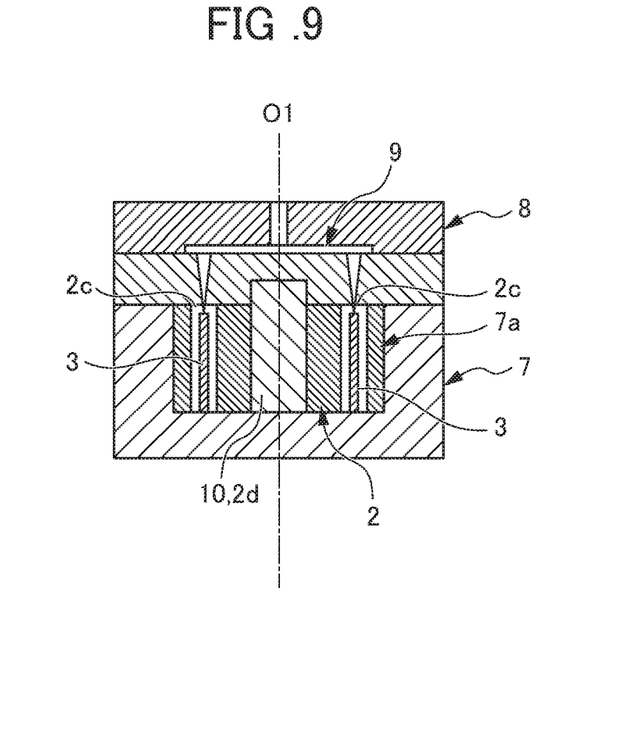
FIG. 9 is a cross-sectional view showing a manufacturing device and a manufacturing method for a conventional rotor core (an IPM-type rotor core)
Figure 10:
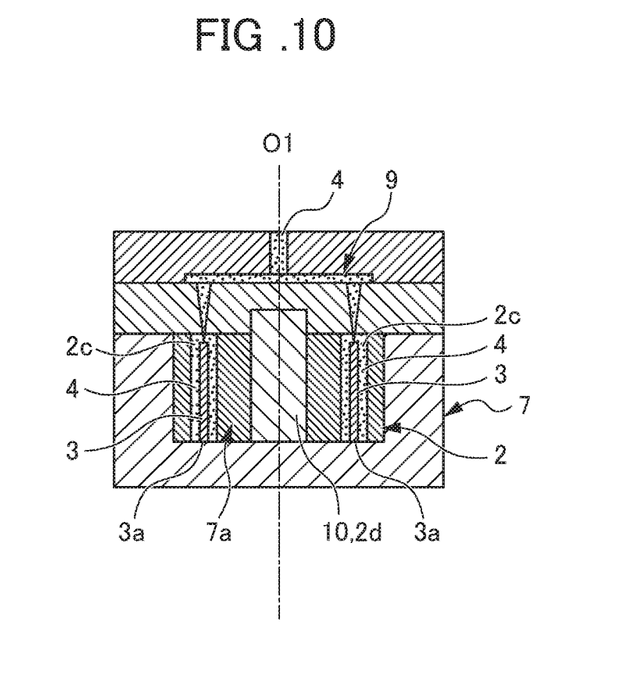
FIG. 10 is a cross-sectional view showing a manufacturing device and a manufacturing method for a conventional rotor core (an IPM-type rotor core)
Figure 11:
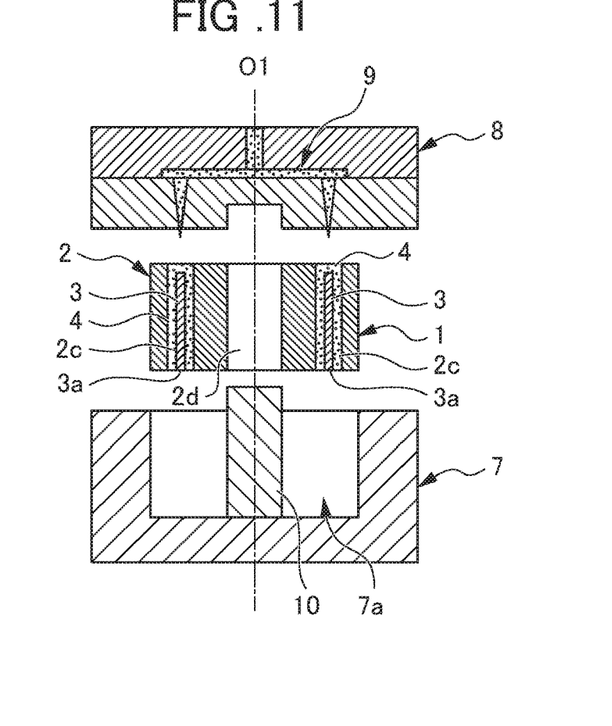
FIG. 11 is a cross-sectional view showing a conventional rotor (rotor structure)

When manufacturing the rotor cores 1 and 5, as shown in FIGS. 8 and 9, after clamping the first mold 7 and the second mold 8 and sealing the laminated iron core 2, as shown in FIG. 10, the resin material 4 is injected into the magnet insertion hole 2c from the resin injection unit 9 (or between the exterior member 6 and the laminated iron core 2) by using an injection molding machine. As shown in FIG. 11, the molds 7 and 8 are opened at the appropriate timing, thereby removing the rotor core 1(5) by form removal. The rotor core 1(5) in which the permanent magnet 3 is embedded and fixed by the resin material 4 is thereby manufactured.

Patent Document 1: Domestic Re-publication of PCT International Publication for Patent Applications WO2016/147211

SUMMARY OF THE INVENTION

Figure 12:
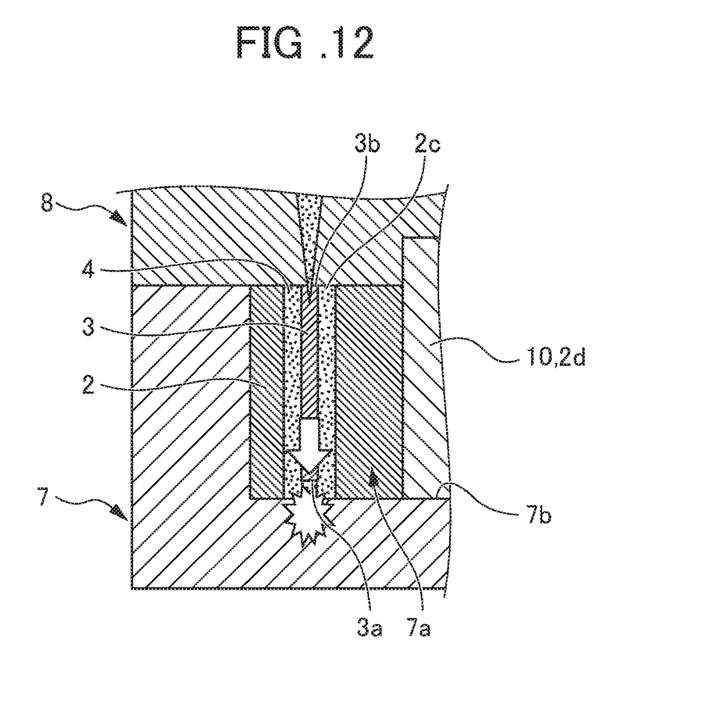
FIG. 12 is a cross-sectional view showing a manufacturing device and a manufacturing method for a conventional rotor core (an IPM-type rotor core); and shows that an end of a magnet collides with a mold surface when injecting a resin material.

On the other hand, in the manufacturing device and manufacturing method for conventional rotor cores, as shown in FIG. 12, when injecting the resin material 4 into the interior of the magnet insertion hole 2c, the magnet 3 is moved due to an injection pressure, and an end 3a of the magnet 3 abuts against (collides with) a mold surface 7b, possibly causing damage such as cracking in the magnet 3.

For this reason, a method has been desired of preventing damage from being caused to the magnet 3 by the collision to the mold surface 7b due to the injection pressure of the resin material 4.

An aspect of a device for manufacturing a rotor core according to the present disclosure includes: a first mold including a fitting recess that fits and holds a laminated iron core in which a magnet is inserted into a magnet insertion hole or a laminated iron core in which a magnet and an exterior member are mounted on an outer circumferential side; a second mold that is engaged with the first mold and clamps and seals the laminated iron core together with the first mold;

In an aspect of a method for manufacturing a rotor core according to the present disclosure, a resin injection unit that is provided to the first mold or the second mold, and injects a resin material into the magnet insertion hole or between the exterior member and the laminated iron core by using a molding machine; and a magnet positioning and holding mechanism that positions and holds the magnet in a state of being fit into the fitting recess of the first mold.

According the aspect above, it is possible to position and hold the magnet inserted into the magnet insertion hole in a state in which the end thereof is spaced apart from the mold surface in advance, or in a state bringing the end into contact therewith in advance so that the magnet is in no way moved due to the injection pressure of the resin material. With such a configuration, it is possible to securely prevent damage from being caused to a magnet by the collision to a mold surface due to the injection pressure of a resin material.

DETAILED DESCRIPTION OF THE INVENTION

Hereinafter, with reference to FIGS. 1 to 5, a description will be given of a device for manufacturing a rotor core and a method for manufacturing a rotor core.

Here, as shown in FIGS. 1 and 2, rotor cores 1 and 5 of the present embodiment configure a rotor of an electric rotating machine such as a motor of an automobile or an electric appliance, by inserting a shaft into a center core (shaft core) 2d that is formed to penetrate around an axis line O1 and integrally mounting the rotor cores on the same axis with the shaft.

In the present embodiment, the rotor core 1 will be described as an IPM-type rotor core (interior permanent magnet type rotor core).

For example, as shown in FIG. 1, the rotor core 1 of the present embodiment includes: a laminated iron core (core) 2 in which a plurality of core members (thin plate-shaped members) formed by punching an electromagnetic steel sheet is laminated; permanent magnets (magnets) 3 that are each inserted into and arranged in a magnet insertion hole 2c formed to penetrate from one end 2a to the other end 2b in an axis line O1 direction of the laminated iron core 2; and a resin material 4 for embedding and fixing the permanent magnet 3 by injecting the resin material 4 into the magnet insertion hole 2c.

Figure 3:
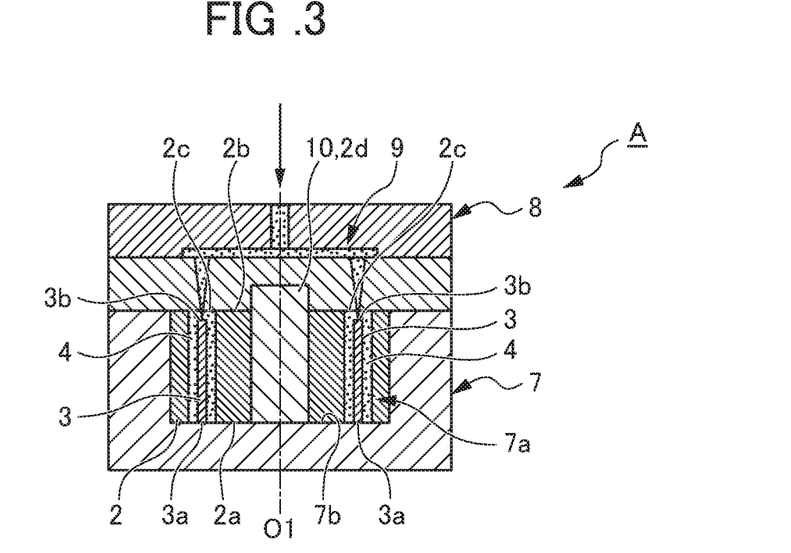
FIG. 3 is a cross-sectional view showing a manufacturing device and a manufacturing method for a rotor core (an IPM-type rotor core) of one embodiment.
Figure 4:
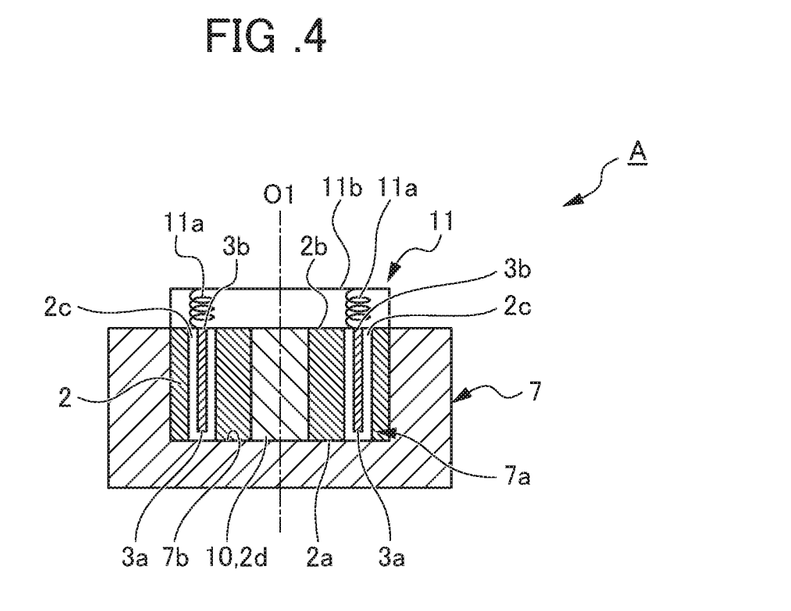
FIG. 4 is a cross-sectional view showing a manufacturing device and a manufacturing method for a rotor core (an IPM-type rotor core) of the first embodiment.
Figure 5:
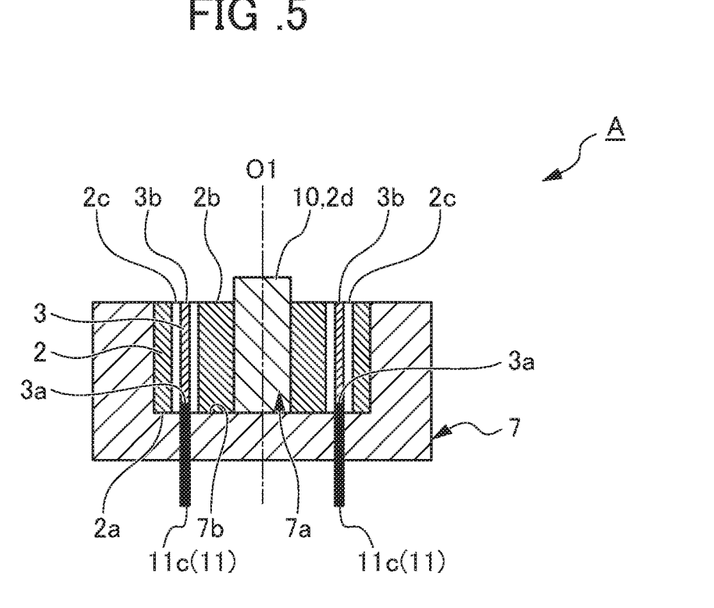
FIG. 5 is a cross-sectional view showing a manufacturing device and a manufacturing method for a rotor core (an IPM-type rotor core) of the first embodiment.

As illustrated in FIGS. 3, 4, and 5, a device A for manufacturing the rotor core 1 (a manufacturing device for a rotor core) of the present embodiment including the abovementioned configuration includes: a first mold 7 having a fitting recess 7a that fits and holds the laminated iron core 2 in which the permanent magnet 3 is inserted into the magnet insertion hole 2c, and a columnar core rod 10 that is fit in the center hole 2d formed to penetrate in the axis line O1 of the laminated iron core 2; a second mold 8 that is engaged with the first mold 7 and clamps and seals the laminated iron core 2 together with the first mold 7; a resin injection unit 9 that is provided to the second mold 8 and injects a resin material 4 in the magnet insertion hole 2c by using an injection molding machine; and a magnet positioning and holding mechanism 11 for positioning and holding the permanent magnet 3 inserted into the interior of the magnet insertion hole 2c.

The resin material 4 is delivered to the resin injection unit 9 provided to the second mold 8 from an injection molding machine, and the resin injection unit 9 includes a resin flow channel through which the resin material 4 is delivered and injected to the magnet insertion hole 2c of the laminated iron core 2 clamped by the first mold 7 and the second mold 8.

As shown in FIG. 4, for the magnet positioning and holding mechanism 11 of the present embodiment, a manufacturing jig 11b including at least one of an electromagnet 11a, a permanent magnet, and an air suction mechanism is a main constituent element, and the magnet positioning and holding mechanism 11 is configured to apply the magnetic force of the electromagnet 11a of the manufacturing jig 11 or the magnetic force of a permanent magnet and air suction force of the air suction mechanism to the permanent magnet 3 inserted into the magnet insertion hole 2c, thereby positioning and holding the permanent magnet 3 by pulling the permanent magnet 3 toward the other end 2b side of the laminated iron core 2 in a state in which the laminated iron core 2 is fit into the fitting recess 7a of the first mold 7. It should be noted that, in FIG. 4, the magnet positioning and holding mechanism 11 includes the electromagnet 11a.

Alternatively, as shown in FIG. 5, the magnet positioning and holding mechanism 11 of the present embodiment may be configured such that the magnet positioning and holding mechanism is provided so as to penetrate from the outside of the first mold 7 to the fitting recess 7a, pressure force is applied to the end 3a on the one end 2a side of the laminated iron core 2 of the permanent magnet 3 inserted into the magnet insertion hole 2c in a state in which the laminated iron core 2 is fit into the fitting recess 7a of the first mold 7, and the permanent magnet 3 is arranged on the other end 2b side of the laminated iron core 2 inside the magnet insertion hole 2c. Examples of such a magnet positioning and holding mechanism 11 equipped to the first mold 7 include a mechanical magnet pressing mechanism 11c such as a pushpin, and it is possible to position and hold the permanent magnet 3 by inserting the pushpin (11c) into the magnet insertion hole 2c to push the permanent magnet 3 toward the other end 2b side of the laminated iron core 2 to hold the permanent magnet 3, for example. It should be noted that the mechanical magnet pressing mechanism 11c is not necessarily limited to the pushpin.

Next, a description will be given of a method for manufacturing a rotor core 1 by using a manufacturing device A for the rotor core 1 of the present embodiment including the above configuration (a method for integrally embedding and fixing the permanent magnet 3 to the laminated iron core 2 by injecting the resin material 4).

First, permanent magnets 3 are inserted into a plurality of magnet insertion holes 2c of the laminated iron core 2 (magnet inserting step).

Next, the laminated iron core 2 is fit into and provided to the fitting recess 7a of the first mold 7 (first mold mounting step).

Next, as shown in FIG. 4, the manufacturing jig 11b is disposed on the other end 2b side of the laminated iron core 2, and the magnetic force of the electromagnet 11a, the magnetic force of a permanent magnet, or air suction force of the air suction mechanism is applied to the permanent magnet 3, thereby pulling the permanent magnet 3 in the magnet insertion hole 2c toward the other end 2b side of the laminated iron core 2 and positioning and holding the permanent magnet 3 by means of the magnetic force and the suction force (magnet positioning and holding step).

Here, in a case in which the magnet positioning and holding mechanism 11 is configured to include the manufacturing jig 11b that applies the magnetic force of the electromagnet 11a, the magnetic force of the permanent magnet, or the suction force of the air suction mechanism to the permanent magnet 3, it may be configured such that the manufacturing jig 11b is provided to the laminated iron core 2 after the permanent magnets 3 are inserted into the plurality of magnet insertion hole 2c to position and hold the permanent magnets 3, and in this state, the laminated iron core 2 is fit into and arranged in the fitting recess 7a of the first mold 7. In other words, the magnet positioning and holding step may be performed prior to the first mold mounting step.

Furthermore, in this case, for example, when the laminated iron core 2 after the permanent magnets 3 being inserted is delivered, and fit and installed in the fitting recess 7a of the first mold 7 by a robot, since the permanent magnets 3 in the magnet insertion hole 2c are held in advance by the magnetic force of the manufacturing jig 11b and the air suction force, it is also possible to prevent the permanent magnet 3 from being pulled out from the magnet insertion hole 2c of the laminated iron core 2.

On the other hand, as shown in FIG. 5, in a case of including the mechanical magnet pressing mechanism 11c such as a pushpin, after the laminated iron core 2 is fit into the fitting recess 7a of the first mold 7 and installed, for example, a pushpin (11c) is inserted into the magnet insertion hole 2c to push the permanent magnet 3 toward the other end 2b side of the laminated iron core 2, thereby positioning and holding the permanent magnet 3 (magnet positioning and holding step).

Next, the second mold 8 is engaged with the first mold 7, thereby clamping and sealing the laminated iron core 2 together with the first mold 7 (second mold mounting step).

Thereafter, the resin material 4 is injected to the magnet insertion hole 2c by an injection molding machine through the resin injection unit 9 provided to the second mold 8 (resin injecting step).

At this time, since the permanent magnet 3 in the magnet insertion hole 2c is positioned and held by the magnet positioning and holding mechanism 11, the permanent magnet 3 is in no way moved toward the mold surface 7b side of the first mold 7 by the injection pressure of the resin material 4. Therefore, it is possible to fill the magnet insertion hole 2c with the resin material 4.

Next, the molds 7 and 8 are opened at appropriate timing, thereby removing the rotor core 1 by form removal. It should be noted that the manufacturing jig is adopted to manufacture another rotor core 1.

Therefore, in the manufacturing device A of the rotor core 1 and the manufacturing method for the rotor core 1 of the present embodiment, since, with the magnet positioning and holding mechanism, the permanent magnet 3 inserted into the magnet insertion hole 2c of the laminated iron core 2 is pulled or pushed toward the other end 2b side of the laminated iron core 2 (injection port side of the resin material 4) and thus positioned and held, the permanent magnet 3 is in no way moved toward the mold surface 7b side of the first mold 7 due to the injection pressure of the resin material 4.

Therefore, according to the manufacturing device A for the rotor core 1 and the manufacturing method for the rotor core 1 of the present embodiment, it is possible to securely prevent damage from being caused to the magnet 3 by the permanent magnet 3 moving in the magnet insertion hole 2c due to the injection pressure when injecting the resin material 4 conventionally, leading to the collision of the end 3a of the permanent magnet 3 to the mold surface 7b. With such a configuration, it is possible to manufacture the rotor core 1 with high quality and high reliability. Furthermore, it is possible to achieve improved productivity of the rotor core 1.

Furthermore, the manufacturing device A for the rotor core 1 of the present embodiment can also be used to prevent the permanent magnet 3 from being pulled out from the magnet insertion hole 2c while the laminated iron core 2 in which the permanent magnet 3 is inserted into the magnet insertion hole 2c of the laminated iron core 2 is delivered to the first mold 7 and fit into the fitting recess 7a.

As described above, the description of the first embodiment has been given of the manufacturing device for the rotor core and the manufacturing method for the rotor core; however, the present invention is not limited to one embodiment described above, and can be modified to the extent that does not deviate from the gist of the present invention.

For example, in the present embodiment, the rotor core has been described as an IPM-type rotor core (interior magnet type rotor core); however, it may be an SPM-type rotor core (surface magnet type rotor core).

Specifically, as shown in FIG. 2, for example, the SPM-type rotor core 5 includes the laminated iron core 2, the permanent magnets 3 which are arranged at equal intervals in the circumferential direction on the outer peripheral surface side of the laminated iron core 2, the cylindrical exterior member 6 which surrounds and covers the laminated iron core 2 with the permanent magnets 3, the resin material 4 for embedding and fixing the permanent magnets 3 by injecting the resin material 4 between the exterior member 6 and the laminated iron core 2, and the magnet positioning and holding mechanism 11.

In a case of manufacturing this SPM-type rotor core 5, similarly to the present embodiment, the magnet positioning and holding mechanism 11 such as the manufacturing jig 11 or a pushpin (the mechanical magnet pressing mechanism 11c) is used to pull or push the magnet 3 provided between the exterior member 6 and the laminated iron core 2, and thus the magnet 3 is positioned and held. With such a configuration, when the permanent magnet 3 is embedded and fixed by injecting a resin material between the exterior member 6 and the laminated iron core 2 from the resin injection unit 9, the permanent magnet 3 is in no way moved, and thus it is possible to obtain an operational effect similar to that of the present embodiment.

Next, with reference to FIGS. 1, 3, 6, and 7, a description will be given of a manufacturing device A for a rotor core and a manufacturing method for a rotor core according to the second embodiment.

Here, the present embodiment differs from the first embodiment in the configuration of the magnet positioning and holding mechanism 11, i.e., only the position for positioning and holding the permanent magnet 3 in the interior of the magnet insertion hole 2c of the laminated iron core 2. Therefore, the same reference symbols are provided to configurations similar to those of the first embodiments, and detailed descriptions thereof are omitted.

Figure 6:
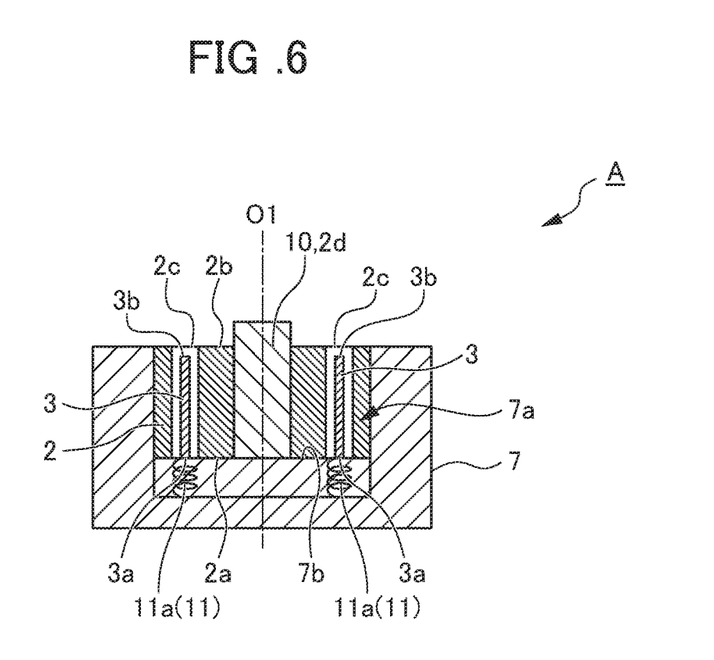
FIG. 6 is an enlarged view showing a guide plate and a protrusion of a manufacturing device for a rotor core (an IPM-type rotor core) of the second embodiment.
Figure 7:
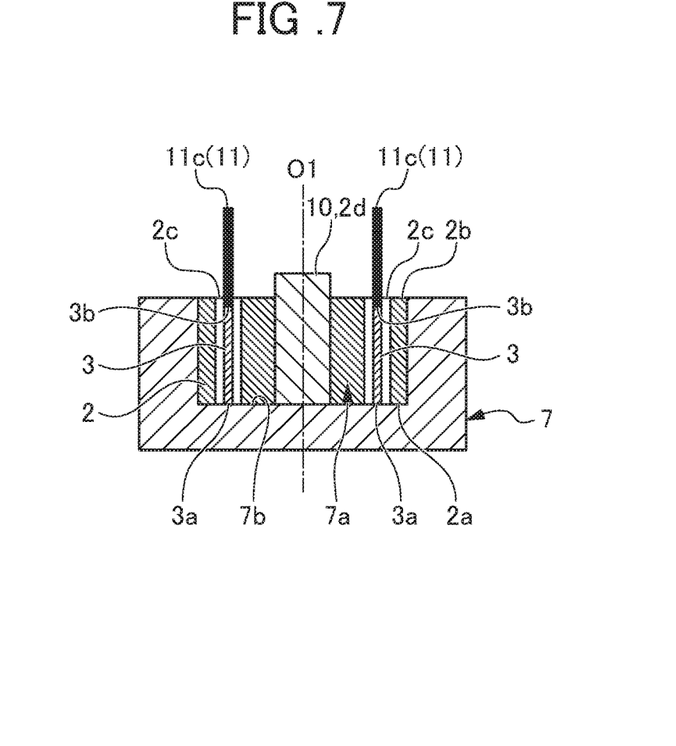
FIG. 7 is a cross-sectional view showing a manufacturing device and a manufacturing method for a rotor core (an IPM-type rotor core) of the second embodiment.

The magnet positioning and holding mechanism 11 of the present embodiment is not configured to pull or push the permanent magnet 3 inserted into the magnet insertion hole 2c of the laminated iron core 2 as in the first embodiment toward the other end 2b side of the laminated iron core 2 so that the one end 3a and the mold surface 7b are spaced apart from each other, thereby positioning and holding the permanent magnet 3, but rather is configured as shown in FIGS. 6 and 7 so as to pull or push the permanent magnet 3 so that the one end 3a of the permanent magnet 3 is brought into direct (indirect) contact with the mold surface 7b of the first mold 7, thereby positioning and holding the permanent magnet 3.

More specifically, as illustrated in FIG. 6, the magnet positioning and holding mechanism 11 of the present embodiment is configured such that at least one of an electromagnet 11a provided at a predetermined location of the first mold 7, a permanent magnet, or an air suction mechanism is a main constituent element, the magnetic force of the electromagnet or a permanent magnet and air suction force of the air suction mechanism are applied to the permanent magnet 3 inserted into the magnet insertion hole 2c, thereby positioning and holding the permanent magnet 3 by pulling the permanent magnet 3 toward the one end 2a side of the laminated iron core 2 and bringing the one end 3a of the permanent magnet 3 into direct or indirect contact with the mold surface 7b in a state in which the laminated iron core 2 is fit into the fitting recess 7a of the first mold 7.

Alternatively, the magnet positioning and holding mechanism 11 of the present embodiment may be configured such that, in a state in which the laminated iron core 2 is fit into the fitting recess 7a of the first mold 7, the magnet positioning and holding mechanism 11 is inserted into the magnet insertion hole 2c from the other end 2b side of the laminated iron core 2, force is applied to the other end 3b of the permanent magnet 3, and the permanent magnet 3 is pushed deeper into the magnet insertion hole 2c until the one end 3a is brought into contact with the mold surface 7b to position and hold the permanent magnet 3.

Examples of such a magnet positioning and holding mechanism 11 include a member that is configured to hold the permanent magnet 3 by inserting a pushpin (the mechanical magnet pressing mechanism 11c) into the magnet insertion hole 2c and pushing the permanent magnet 3. Alternatively, it may be configured to include an electromagnet, a permanent magnet, an air pressing mechanism, etc., so that the permanent magnet 3 is pushed by blowing air inside the magnet insertion hole 2c, or repulsive force derived from magnet force is applied to push the permanent magnet 3.

A description will be given of a method for manufacturing the rotor core 1 by using the manufacturing device A for the rotor core 1 of the present embodiment including the above-mentioned configuration (a method for injecting the resin material 4, and embedding and fixing integrally the permanent magnet 3 into the laminated iron core 2).

First, permanent magnets 3 are inserted into a plurality of magnet insertion holes 2c of the laminated iron core 2 (magnet inserting step).

Next, the laminated iron core 2 is fit into and provided to the fitting recess 7a of the first mold 7 (first mold mounting step).

Here, as the magnet positioning and holding mechanism 11, in a case of applying the electromagnet 11a, a permanent magnet, or an air suction mechanism, the magnet force of the electromagnet 11a, the magnet force of the permanent magnet, or suction force of the air suction mechanism is applied to the permanent magnet 3, the permanent magnet 3 is pulled toward the mold surface 7b, and the permanent magnet 3 is positioned and held in a state in which the one end 3a thereof is brought into contact with the mold surface 7b (magnet positioning and holding step).

On the other hand, as the magnet positioning and holding mechanism 11, in a case of adopting the mechanical magnet pressing mechanism 11 such as a pushpin and an air pressing mechanism, a pushpin is pushed from the other end 2b of the laminated iron core 2 into the magnet insertion hole 2c, and air is blown to push the permanent magnet 3 deeper into the magnet insertion hole 2c. Thereafter, the permanent magnet 3 is positioned and held in a state in which the one end 3a thereof is brought into contact with the mold surface 7b (magnet positioning and holding step).

Next, the second mold 8 is engaged with the first mold 7, thereby clamping and sealing the laminated iron core 2 together with the first mold 7 (second mold mounting step).

Thereafter, the resin material 4 is injected into the magnet insertion hole 2c by an injection molding machine through the resin injection unit 9 provided to the second mold 8 (resin injecting step).

At this time, since the permanent magnet 3 in the magnet insertion hole 2c is positioned and held by the magnet positioning and holding mechanism by bringing the one end 3a thereof into contact with the mold surface 7b, the permanent magnet 3 is in no way moved toward the mold surface 7b side of the first mold 7 by the injection pressure of the resin material 4.

Next, the molds 7 and 8 are opened at appropriate timing, thereby removing the rotor core 1 by form removal.

Therefore, in the manufacturing device A for the rotor core 1 and the manufacturing method for the rotor core 1 of the present embodiment, since, with the magnet positioning and holding mechanism, the permanent magnet 3 inserted into the magnet insertion hole 2c of the laminated iron core 2 is pulled or pushed toward the mold surface 7b side on the one end 2a side of the laminated iron core 2, and thus positioned and held, the permanent magnet 3 is in no way moved toward the mold surface 7b side of the first mold 7 due to the injection pressure of the resin material 4.

Therefore, according to the manufacturing device A for the rotor core 1 and the manufacturing method for the rotor core 1 of the present embodiment, it is possible to securely prevent damage from being caused to the magnet 3 by the permanent magnet 3 moving in the magnet insertion hole 2c due to the injection pressure when injecting the resin material 4 conventionally, leading to the collision of the end 3a of the permanent magnet 3 to the mold surface 7b. With such a configuration, it is possible to manufacture the rotor core 1 with high quality and high reliability. Furthermore, it is possible to achieve improved productivity of the rotor core 1.

a description of the second embodiment of the manufacturing device for the rotor core and the manufacturing method for the rotor core has been given above; however, the present invention is not limited to the second embodiment described above, and may be configured variously including modified examples of the first embodiment.

EXPLANATION OF REFERENCE NUMERALS

1 IPM-type rotor core (rotor core)
1 laminated iron core
2a one end
2b other end
2c magnet insertion hole
2d center hole (shaft hole)
3 permanent magnet (magnet)
4 resin material
5 SPM-type rotor core (rotor core)
6 exterior member
7 first mold
7a fitting recess
7b mold surface
8 second mold
9 resin injection unit 10 core rod
11 magnet positioning and holding mechanism
11*a* electromagnet
11*b* manufacturing jig
11*c* pushpin (mechanical magnet pressing mechanism)
A manufacturing device for rotor core
O1 axis line

What is claimed is:

1. A device for manufacturing a rotor core, the device comprising:
    a first mold including a fitting recess that fits and holds a laminated iron core in which a magnet is inserted into a magnet insertion hole or a laminated iron core in which a magnet and an exterior member are mounted on an outer circumferential side;
    a second mold that is engaged with the first mold and clamps and seals the laminated iron core together with the first mold;
    a resin injection unit that is provided to the first mold or the second mold, and injects a resin material into the magnet insertion hole or between the exterior member and the laminated iron core by using a molding machine; and
    a magnet positioning and holding mechanism that positions and holds the magnet in a state of being fit into the fitting recess of the first mold;
    wherein the magnet positioning and holding mechanism is configured to position and hold the magnet by pulling the magnet toward an end side of the laminated iron core facing the second mold without pulling or pushing the magnet towards a mold surface that forms the fitting recess of the first mold, such that an end of the magnet is spaced apart from the mold surface that forms the fitting recess of the first mold.

2. A method for manufacturing a rotor core using the manufacturing device for the rotor core according to claim 1, the method comprising:
    injecting a resin material into a magnet insertion hole or between an exterior member and laminated iron core in a state in which the magnet is positioned and held by the magnet positioning and holding mechanism.

* * * * *